(12) United States Patent
Abe et al.

(10) Patent No.: US 9,595,998 B2
(45) Date of Patent: Mar. 14, 2017

(54) SAMPLING POINT ADJUSTMENT APPARATUS AND METHOD AND PROGRAM

(71) Applicant: SONY CORPORATION, Tokyo (JP)

(72) Inventors: Mototsugu Abe, Kanagawa (JP); Masayuki Nishiguchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 120 days.

(21) Appl. No.: 14/507,203

(22) Filed: Oct. 6, 2014

(65) Prior Publication Data

US 2015/0117656 A1 Apr. 30, 2015

(30) Foreign Application Priority Data

Oct. 25, 2013 (JP) .................. 2013-221864

(51) Int. Cl.
*H04B 3/20* (2006.01)
*H04B 3/23* (2006.01)

(52) U.S. Cl.
CPC .................. *H04B 3/232* (2013.01)

(58) Field of Classification Search
CPC .................................. H04B 3/232
See application file for complete search history.

(56) References Cited

U.S. PATENT DOCUMENTS

2011/0175676 A1\* 7/2011 Sugiyama ............... H04M 3/56
327/551

OTHER PUBLICATIONS

E. Robledo-Arnuncio, et al., "On Dealing with Sampling Rate Mismatches in Blind Source Separation and Acoustic Echo Cancellation", IEEE Workshop on Applications of Signal Processing to Audio and Acoustics, pp. 34-37, 2007.
M. Pawig, et al., "Adaptive Sampling Rate Correction for Acoustic Echo Control in Voice-Over-IP", IEEE Transactions on Signal Processing, pp. 189-199, vol. 58, No. 1, 2010.
Iikuni, Yoji, Adaptive Signal Processing Algorithm, Jul. 17, 2000, pp. 8-11, Baifukan Co., Ltd., Tokyo Japan.

\* cited by examiner

*Primary Examiner* — Regina N. Holder
(74) *Attorney, Agent, or Firm* — Chip Law Group

(57) ABSTRACT

There is provided a sampling point adjustment apparatus including: a frequency conversion unit that converts a first signal and a second signal into a first narrow band signal and a second narrow band signal through frequency conversion; a central position determination unit that determines a central position of a window of the frequency conversion for the second signal based on an estimated value of a sampling interval offset between the first narrow band signal and the second narrow band signal; and a phase control unit that controls a phase of the second narrow band signal based on the estimated value.

8 Claims, 12 Drawing Sheets

SAMPLING POINT ADJUSTMENT APPARATUS AND METHOD AND PROGRAM

CROSS REFERENCE TO RELATED APPLICATIONS

This application claims the benefit of Japanese Priority Patent Application JP 2013-221864 filed Oct. 25, 2013, the entire contents of which are incorporated herein by reference.

BACKGROUND

The present disclosure relates to sampling point adjustment apparatus and method and a program, and in particular, to a sampling point adjustment apparatus and method and a program capable of suppressing echo with high arithmetic efficiency and high precision.

In the related art, an acoustic echo canceller has been used in, for example, equipment which includes both a microphone and a speaker, such as a speaker phone, a video conference system, or the sound operation of a television receiver provided with a sound recognition function. Such an acoustic echo canceller has been used to suppress sound generated in such a way that sound reproduced from a speaker is wrapped around the input of a microphone, that is, acoustic echo.

In the general acoustic echo canceller, the signal of the sound reproduced from the speaker is acquired as a reference signal within equipment and the waveform of the reference signal is deformed by a filter which simulates propagation characteristics from the speaker to the microphone. Further, the reference signal on which a filtering process is performed is subtracted from an input signal acquired from the microphone, and thus acoustic echo is suppressed (for example, refer to Yougi Iiguni, "Adaptive Signal Processing Algorithm", Baifukan (2000)).

However, in the acoustic echo cancelling apparatus, it is necessary that the sampling interval between Analog to Digital (AD) conversion performed on the input signal and Digital to Analog (DA) conversion performed on the reference signal should be accurately synchronized. The reason for this is that, if the sampling interval between the AD conversion and the DA conversion is deviated, echo suppression performance is sharply deteriorated when the amount of deviation is large (for example, refer to E. Robledo-Arnuncio, T. S. Wada and B. H. Juang "On Dealing with Sampling Rate Mismatches in Blind Source Separation and Acoustic Echo Cancellation" Proc. WASPAA, 34/37 (2007)).

However, with the increasing complexity of recent electronic equipment, cases in which a single piece of equipment is provided with a plurality of oscillators therein increase. In such equipment, there is a case in which original oscillators for sampling clocks supplied to a microphone and a speaker are different from each other. In this case, even when the respective sampling clocks are adjusted to have the same sampling frequency, the sampling interval between the AD conversion and the DA conversion is deviated because of element errors, change in temperature, or the like.

Here, in the acoustic echo cancelling apparatus, a technology has been proposed which causes the sampling interval of a reference signal to match with the sampling interval of an input signal by measuring sampling interval deviation and performing sampling rate conversion (for example, refer to M. Pawig, G. Enzner and P. Vary "Adaptive Sampling Rate Correction for Acoustic Echo Control in Voice-Over-IP"). The technology is configured such that the measurement of the sampling interval deviation and the estimation of a filtering coefficient are performed at the same time.

SUMMARY

However, in the technology disclosed in M. Pawig, G. Enzner and P. Vary "Adaptive Sampling Rate Correction for Acoustic Echo Control in Voice-Over-IP", the sampling rate conversion process is separately operated plainly, and thus not only the calculation amount increases but also echo suppression performance is not sufficient.

It is desirable to provide sampling point adjustment apparatus and method and a program capable of performing echo suppression with high arithmetic efficiency and high precision.

According to an embodiment of the present disclosure, there is provided a sampling point adjustment apparatus including: a frequency conversion unit that converts a first signal and a second signal into a first narrow band signal and a second narrow band signal through frequency conversion; a central position determination unit that determines a central position of a window of the frequency conversion for the second signal based on an estimated value of a sampling interval offset between the first narrow band signal and the second narrow band signal; and a phase control unit that controls a phase of the second narrow band signal based on the estimated value.

The sampling point adjustment apparatus may further include a filter processing unit that performs a filtering process on the second narrow band signal, the phase of which is controlled by the phase control unit The sampling point adjustment apparatus may further include a subtraction unit that suppresses an echo component of the second signal, which is included in the first signal, by subtracting the second narrow band signal on which the filtering process is performed from the first narrow band signal.

The second signal may be a signal which is reproduced by a speaker, and the first signal may be a signal which is acquired by absorbing peripheral sound including sound based on the second signal.

The sampling point adjustment apparatus may further include an estimation unit that estimates the estimated value of the sampling interval offset based on the first narrow band signal and the second narrow band signal on which the filtering process is performed.

The sampling point adjustment apparatus may further include a coefficient calculation unit that calculates a filtering coefficient to be used for the filtering process based on the first narrow band signal and the second narrow band signal on which the filtering process is performed.

The frequency conversion unit may perform short-time Fourier transform as the frequency conversion.

According to another embodiment of the present disclosure, there is provided a sampling point adjustment method and a program including: converting a first signal and a second signal into a first narrow band signal and a second narrow band signal through frequency conversion; determining a central position of a window of the frequency conversion for the second signal based on an estimated value of a sampling interval offset between the first narrow band signal and the second narrow band signal; and controlling a phase of the second narrow band signal based on the estimated value.

According to the embodiments of the present disclosure, a first signal and a second signal are converted into a first narrow band signal and a second narrow band signal through frequency conversion; a central position of a window of the frequency conversion for the second signal is determined based on an estimated value of a sampling interval offset between the first narrow band signal and the second narrow band signal; and a phase of the second narrow band signal is controlled based on the estimated value.

According to the embodiments of the present disclosure, it is possible to suppress echo with high arithmetic efficiency and high precision.

Meanwhile, the advantages disclosed here are not necessarily limited, and may be any of advantages disclosed in the present disclosure.

DETAILED DESCRIPTION OF EMBODIMENTS

Hereinafter, embodiments of the present disclosure will be described with reference to the accompanying drawings.

First Embodiment

Present Disclosure

Figure 1:
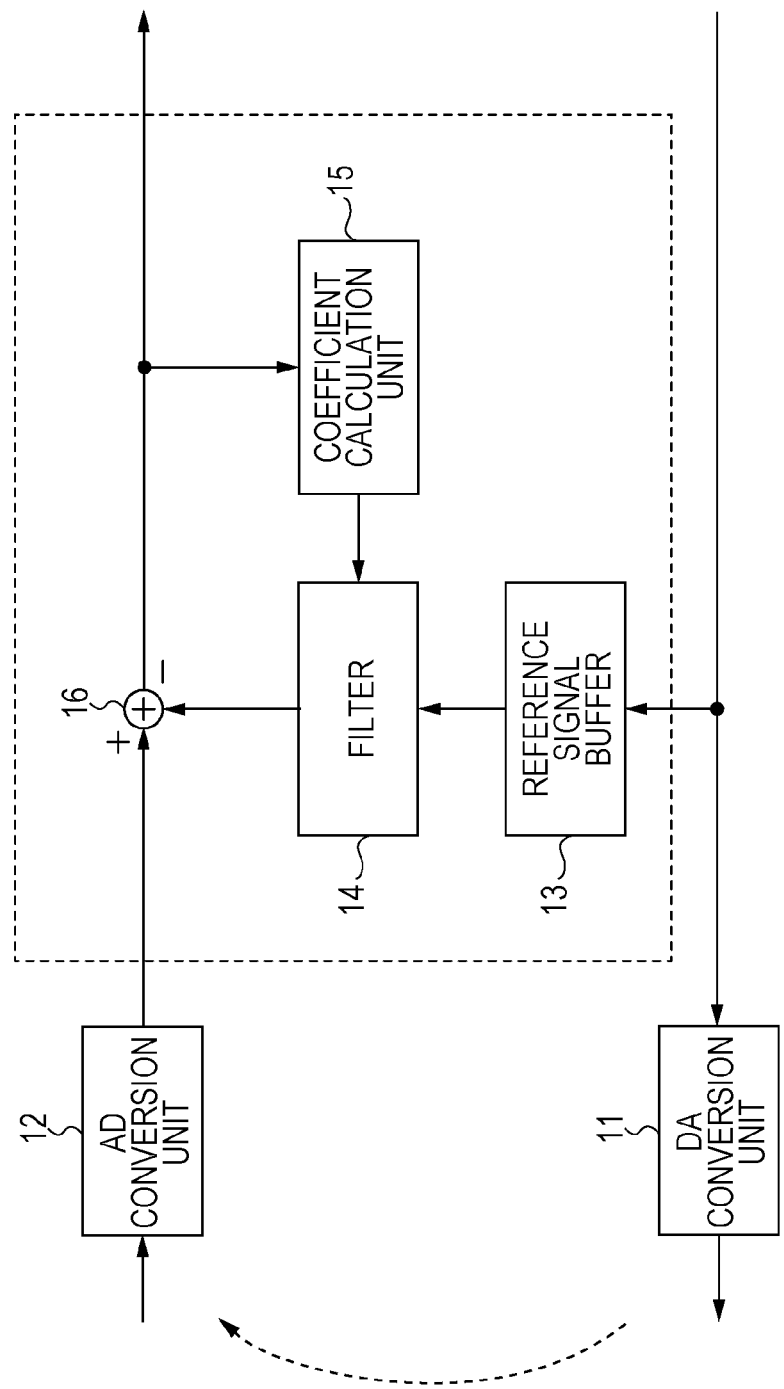
FIG. 1 is a diagram illustrating the configuration of a general acoustic echo canceller.

For example, in a general acoustic echo canceller, a reference signal is converted into an analog signal by a DA conversion unit 11, sound is output from a speaker based on the reference signal converted into the analog signal, as show in FIG. 1. In addition, sound output from the speaker is absorbed into a microphone as acoustic echo together with peripheral sound. An input signal acquired as a result is converted into a digital signal by an AD conversion unit 12.

Further, the reference signal is supplied to a reference signal buffer 13 and is temporarily stored therein within equipment, and a filter 14 performs a filtering process on the reference signal, which is stored in the reference signal buffer 13, using a filtering coefficient which is supplied from a coefficient calculation unit 15, and deforms the wavelength of the reference signal. Here, a filter which includes the filtering coefficient is a filter which simulates propagation characteristics from the speaker to the microphone.

In a subtraction unit 16, a reference signal, which is acquired after deforming a wavelength output from the filter 14, is subtracted from the input signal, which is acquired by the AD conversion unit 12, and thus circulating sounds, that is, acoustic echo, are suppressed. In addition, the coefficient calculation unit 15 updates the filtering coefficient based on the echo-suppressed input signal such that difference between the input signal and the reference signal is minimized as much as possible.

Figure 2:
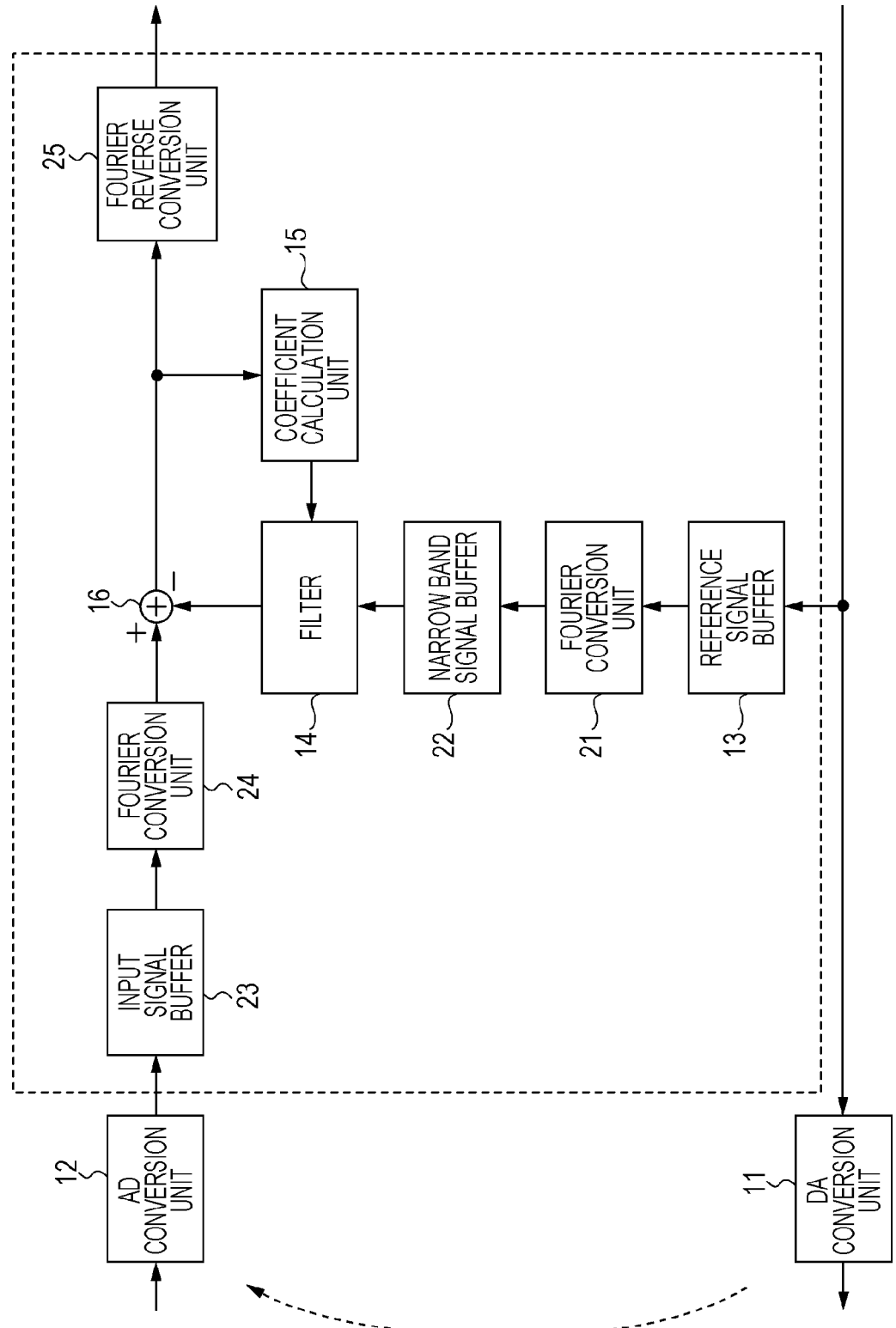
FIG. 2 is a diagram illustrating the configuration of an acoustic echo canceller for a frequency area.

There is an acoustic echo canceller for a frequency area as one method of realizing the acoustic echo canceller. FIG. 2 illustrates the configuration of the acoustic echo canceller for the frequency area. Meanwhile, in FIG. 2, the same reference numerals are attached to parts corresponding to a case of FIG. 1, and the description thereof will not be repeated.

In the acoustic echo canceller for the frequency area shown in FIG. 2, short-time Fourier transform is performed on a reference signal which is stored in a reference signal buffer 13 by a Fourier transform unit 21, and a narrow band signal which is acquired as a result of the short-time Fourier transform is temporarily stored in a narrow band signal buffer 22. Further, a filtering process is performed on the narrow band signal, which is stored in the narrow band signal buffer 22, by a filter 14, and a result is supplied to the subtraction unit 16.

In addition, an input signal output from the AD conversion unit 12 is temporarily stored in an input signal buffer 23. Thereafter, short-time Fourier transform is performed on the input signal by a Fourier transform unit 24, and a narrow band signal, which is acquired as a result of the short-time Fourier transform, is supplied to the subtraction unit 16. Further, the narrow band signal output from the filter 14 is subtracted from the narrow band signal output from the Fourier transform unit 24 by the subtraction unit 16. An output signal acquired as a result of the subtraction is returned to a wide band signal through inverse Fourier transform performed by an inverse Fourier transform unit 25 and the wide band signal is output. In addition, an update operation for the filtering coefficient is performed on the narrowed-band signal by the coefficient calculation unit 15.

When a process is performed after the input signal and the reference signal are caused to have a narrow band as described above, a process is delayed in order to buffer a signal interval necessary for the short-time Fourier transform. However, it is possible to equivalently realize an echo cancelling filter, which is necessary to originally have a long tap length, using a filter having short tap length for each narrow band signal. Therefore, it is possible to realize a high-speed filtering operation with excellent performance.

However, as described above, it is necessary that the sampling intervals of AD conversion and DA conversion are exactly synchronized with each other in the acoustic echo cancelling apparatus.

Figure 3:
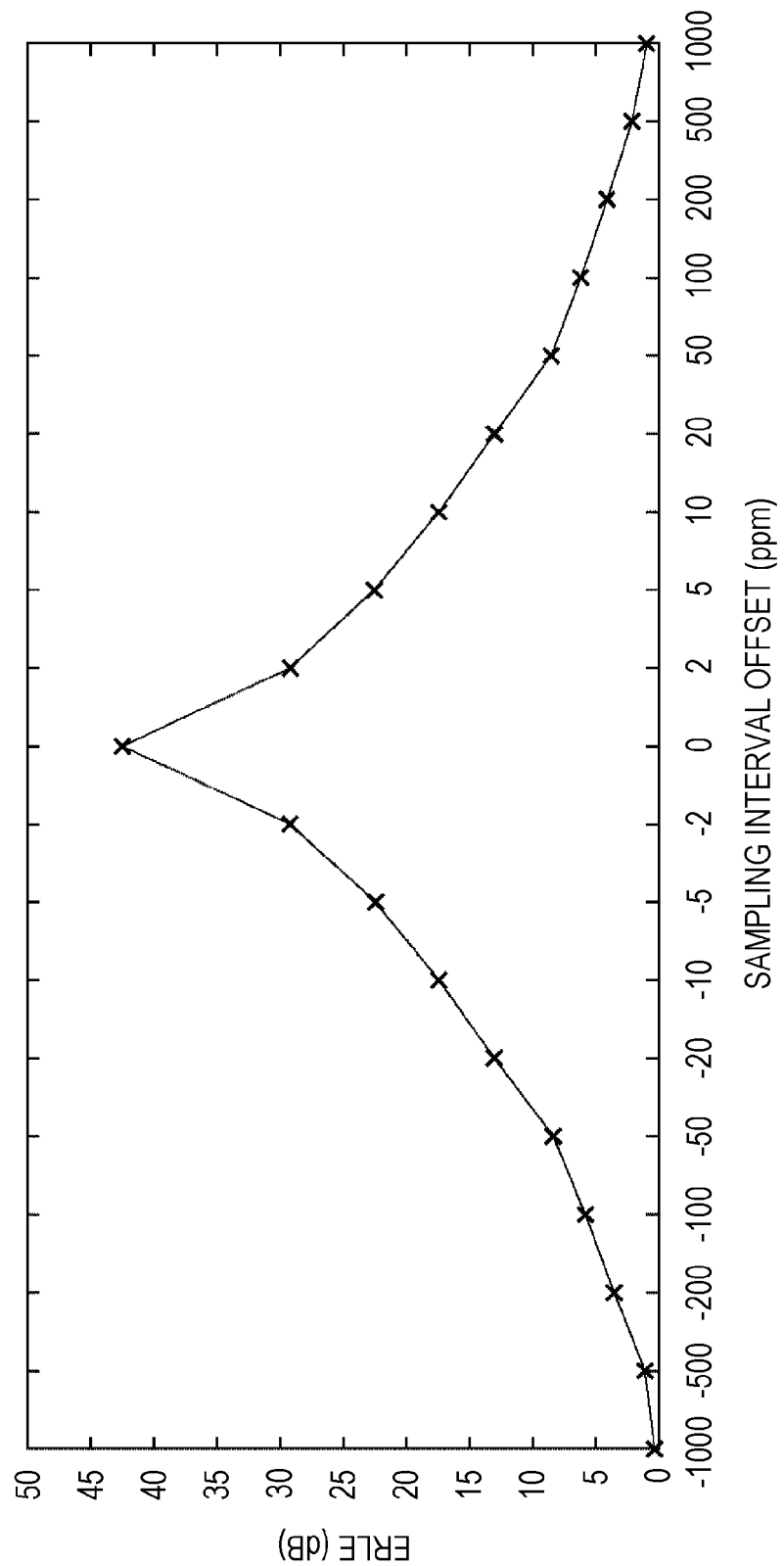
FIG. 3 is a graph illustrating echo suppression performance of the general acoustic echo canceller.

Here, FIG. 3 illustrates echo suppression performance when the sampling intervals of the AD conversion and the DA conversion are deviated in the acoustic echo canceller for the frequency area shown in FIG. 2.

Meanwhile, in FIG. 3, a horizontal axis shows a deviation in sampling intervals, more specifically, shows the amount of deviation of the DA conversion on a speaker side based on the AD conversion on a microphone side. In addition, a vertical axis shows echo suppression performance (Echo Return Loss Enhancement (ERLE)).

In the example, when there is no deviation between the sampling intervals, that is, when a value of the horizontal axis is 0 ppm, a suppression performance of 40 dB or greater is achieved. That is, amplitude is suppressed to $\frac{1}{100}$ or less.

However, if there is a slight deviation of approximately ±10 ppm between the sampling intervals, the suppression performance is deteriorated to approximately 20 dB. Further, if there is a deviation of approximately 100 ppm, the suppression performance is deteriorated to approximately 6 dB. If the deviation between the sampling intervals is approximately ±100 ppm, amplitude is suppressed to only approximately ½, and thus the performance is generally not sufficient to be used as the acoustic echo canceller.

Figure 4:
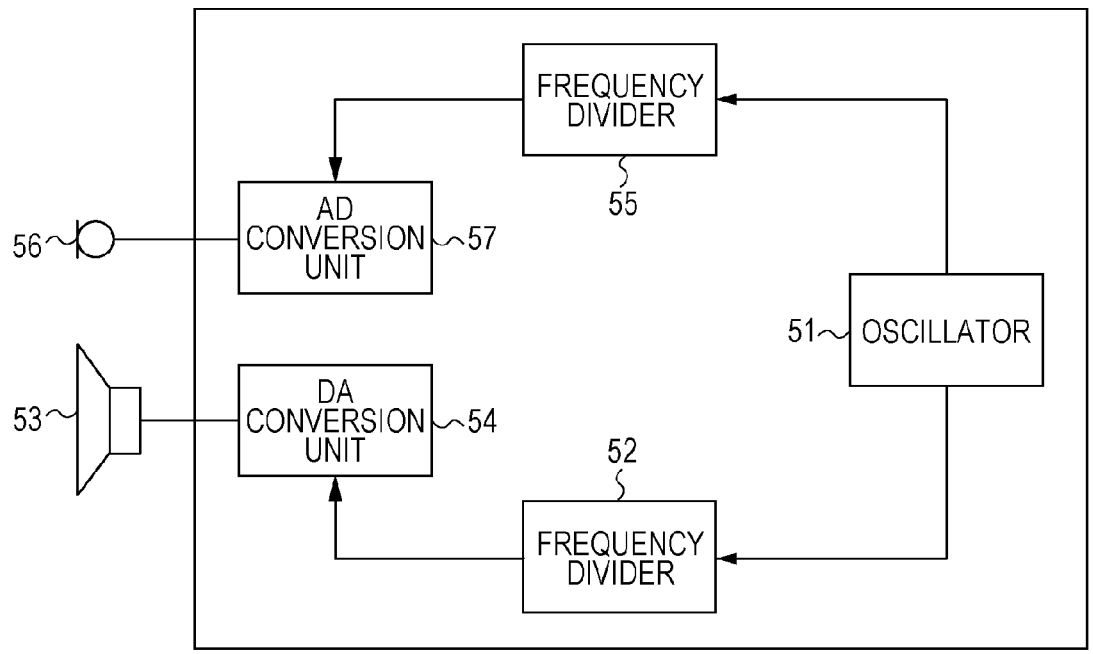
FIG. 4 is a diagram illustrating an example in which an AD conversion is synchronized with a DA conversion.

In a case of equipment having a relatively simple structure according to the related art, for example, only a single original oscillator is present within single equipment in many cases as shown in FIG. 4, and sampling clocks for the AD conversion and the DA conversion are generated through division performed on the output of the original oscillator.

In FIG. 4, a single oscillator 51 is provided in equipment which includes a television receiver, a personal computer, an audio reproduction apparatus, tablet equipment, a multifunctional portable telephone, or the like.

A clock signal output from the oscillator 51 is divided by a frequency divider 52, and clock signals acquired through the division are supplied to a DA conversion unit 54 connected to a speaker 53. In addition, the clock signal output from the oscillator 51 is also supplied to a frequency divider 55. The clock signal is divided by the frequency divider 55, and signals acquired through the division are supplied to an AD conversion unit 57 to which a signal from a microphone 56 is input.

As above, when the clock signal output from the single oscillator 51 is divided and the respective clock signals which are supplied to the DA conversion unit 54 and the AD conversion unit 57 are generated within the equipment, the deviation of the sampling intervals between the DA conversion unit 54 and the AD conversion unit 57 is not generated. That is, for example, even when an oscillating frequency changes due to the element errors or temperature characteristics of the oscillator 51 which is an original oscillator, the AD conversion is synchronized with the DA conversion without change.

However, with the complication of recent electronic equipment, a case in which a plurality of oscillators are provided in a single equipment increases. For example, as shown in FIG. 5, the recent electronic equipment, such as a personal computer or a multifunctional portable telephone, is equipped with a plurality of audio inputs and outputs which have different original oscillators in many cases.

Figure 5:
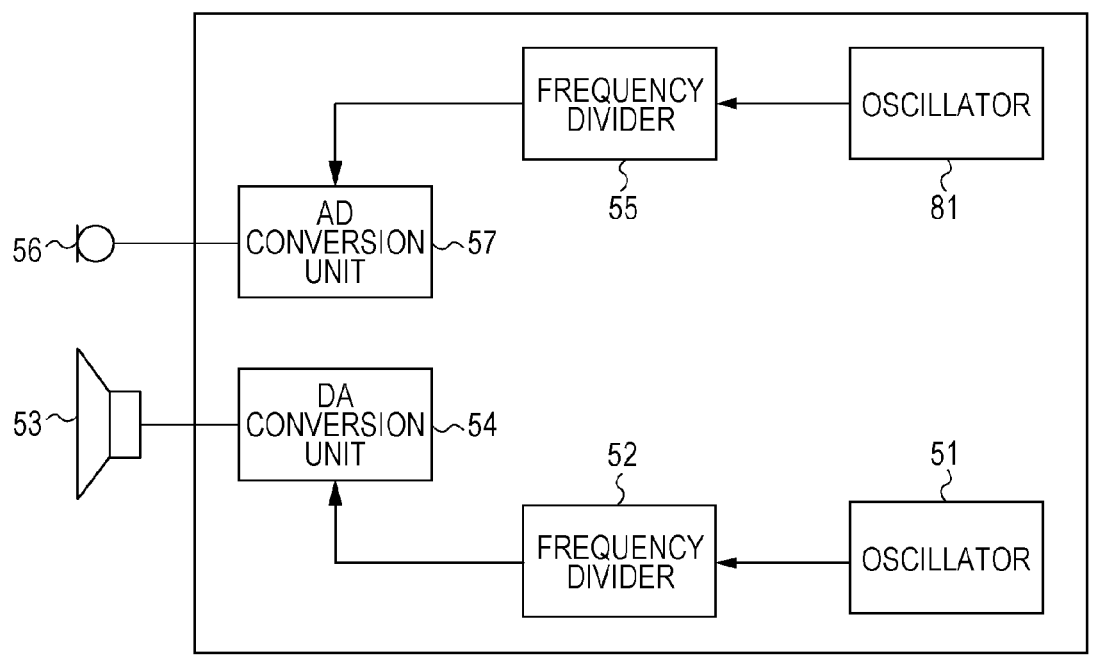
FIG. 5 is a diagram illustrating an example in which the AD conversion is not synchronized with the DA conversion.

Meanwhile, in FIG. 5, the same reference numerals are attached to parts corresponding to a case of FIG. 4, and the description thereof will not be repeated.

In an example of FIG. 5, a clock signal, which is output from an oscillator 51 and is divided by a frequency divider 52, is supplied to a DA conversion unit 54. In contrast, a clock signal which is supplied to an AD conversion unit 57 is output from an oscillator 81 and divided by the frequency divider 55. That is, in the example, two oscillators including the oscillator 51 and the oscillator 81 are provided within equipment, clock signals output from the different oscillators are divided, and thus clock signals which are respectively supplied to the DA conversion unit 54 and the AD conversion unit 57 are generated.

Figure 6:
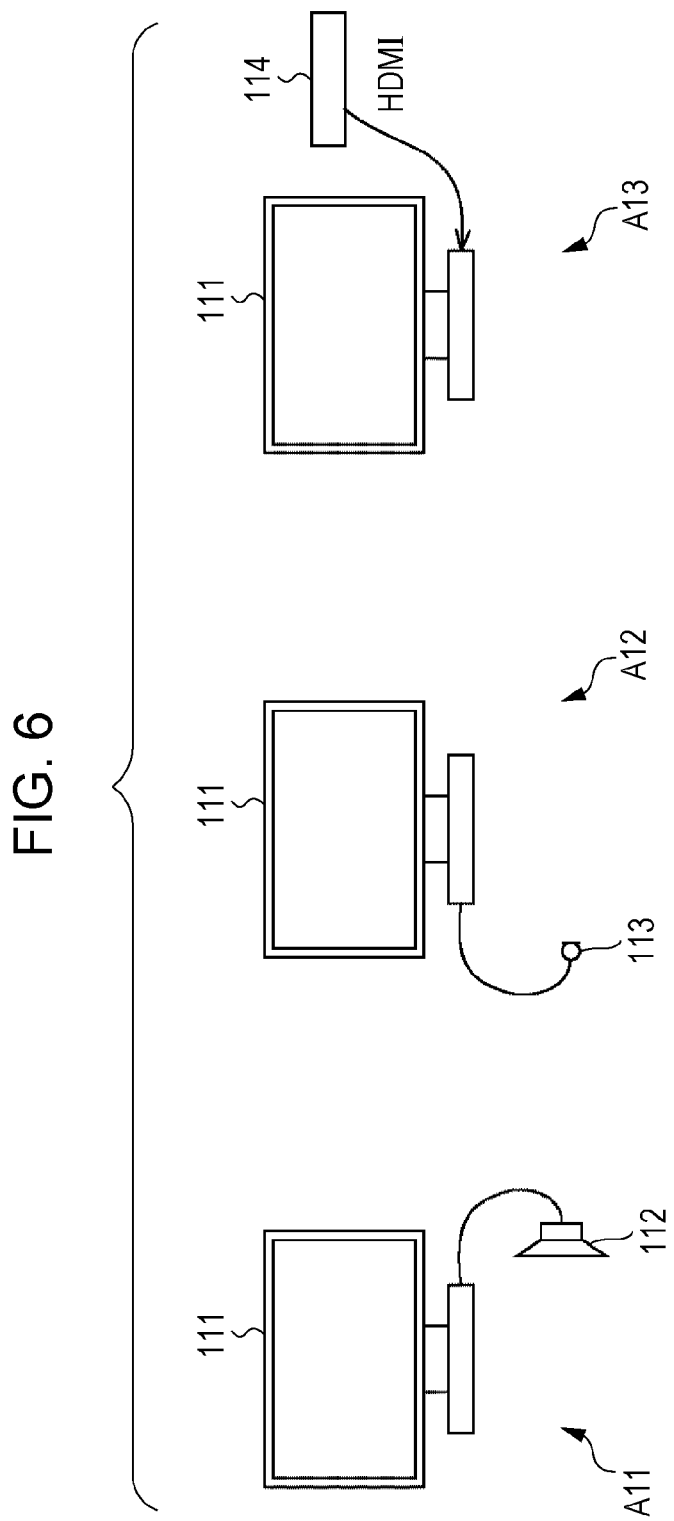
FIG. 6 is a diagram illustrating an example in which the AD conversion is not synchronized with the DA conversion.

In addition, as shown in FIG. 6, when speaker equipment or microphone equipment connected in a wired or wireless manner is used, a case in which equipment, to which sound is supplied from the outside using a method of High Definition Multimedia Interface (HDMI (registered trademark)), is used increases.

For example, in an example indicated using an arrow A11 of FIG. 6, an external speaker 112 is connected to equipment 111, such as the television receiver, through a Universal Serial Bus (USB) or in a wireless manner. Therefore, in this case, DA conversion performed on a signal output to the speaker 112 may not be synchronized with AD conversion performed on a signal of sound absorbed by a microphone built in the equipment 111.

In addition, in an example indicated using an arrow A12, an external microphone 113 is connected to the equipment 111 through a Universal Serial Bus (USB) or in a wireless manner. Therefore, DA conversion performed on a signal output to the speaker built in the equipment 111 may not be synchronized with AD conversion performed on a signal of sound absorbed by the microphone 113.

In the same manner, when sound or images are supplied to the equipment 111 from external reproduction equipment 114 using a method, such as HDMI (registered trademark), as indicated by an arrow A13, DA conversion performed on a signal output to the speaker built in the equipment 111 may not be synchronized with AD conversion performed on a signal of sound absorbed by a microphone built in the equipment 111.

In the examples indicated by the arrows A11 to A13, original oscillators for the sampling clocks supplied to the microphone and the speaker may be different in the equipment 111. In this case, even when both are adjusted to have the same sampling frequency of, for example, 48 kHz, it is difficult to prevent a deviation of approximately several tens to several hundreds of ppm due to element errors, change in temperature, or the like from being generated.

Here, it may be conceivable that (1) the deviation of sampling intervals between an AD converter and a DA converter is measured using any method, (2) conversion is performed such that the sampling interval of any one digital signal of the reference signal and the input signal coincides with the sampling interval of the other signal by a sampling rate converter, and (3) a normal echo canceller is realized using signals acquired through the conversion.

For example, it is possible to realize the measurement of the deviation of the sampling intervals using a technology such as Phase Locked Loop (PLL), and it is possible to realize the conversion performed on the sampling intervals using the sampling rate converter.

However, in such a configuration, (a) a delay time increases because deviation measurement and sampling rate conversion are connected in series, (b) the amount of calculation or the scale of an apparatus increases because respective individual processes are performed, and (c) deterioration in performance occurs because the respective individual processes are performed.

In particular, since the performance of a series connection system is deteriorated in multiplication, the deterioration of performance is remarkable when sampling interval offset measurement and sampling rate conversion are performed. In addition, when the sampling rate converter is used with a non-integral multiple conversion rate, so-called calculation resources, such as the amount of operation and the amount of memory, are very necessary, thereby causing an inefficient configuration.

Meanwhile, a technology in which the sampling interval offset measurement is integrated with an echo cancelling process has been proposed. However, although some of the above-described (a) to (c) are treated, a problem in that a sampling rate conversion process should be separately performed is plainly not solved.

Here, in the present disclosure, echo cancellation is performed while automatically correcting the sampling interval offset between the input signal (microphone signal) and the reference signal (speaker signal). More specifically, when a frequency area echo canceller which performs frame step control and phase control is provided, the estimation and compensation of the offset and updating calculation of the echo cancellation filtering coefficient are integrally performed. In particular, in the configuration of the present disclosure, it is not necessary to plainly perform sampling rate conversion on signals, and thus it is possible to realize an echo canceller for a system which performs asynchronous AD conversion and DA conversion with high arithmetic efficiency and performance.

Here, the outline of the present disclosure will be described with reference to FIG. 7.

Figure 7:
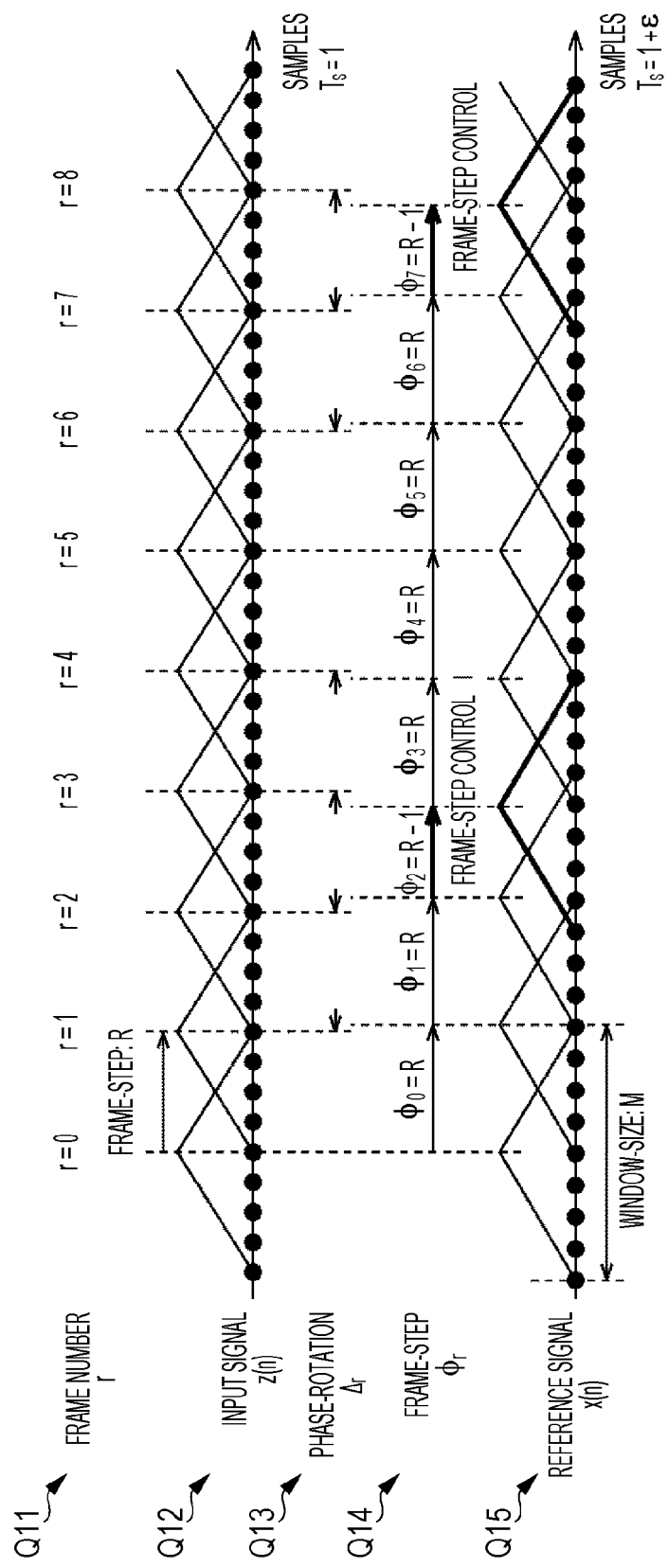
FIG. 7 is a diagram illustrating the outline of an embodiment of the present disclosure.

FIG. 7 is a schematic diagram illustrating an operation of a frequency area echo canceller according to the embodiment of the present disclosure when the sampling intervals of AD conversion performed on an input signal and DA conversion performed on a reference signal are slightly different. Meanwhile, a horizontal direction of FIG. 7 indicates time.

In addition, the uppermost stage of FIG. 7, that is, a stage indicated by an arrow Q11, indicates the frame number r of the input signal and the reference signal which are synchronized and processed, and a second stage, that is, a stage indicated by an arrow Q12, indicates the sample position (time) of an input signal Z(n).

Meanwhile, in the second stage, a single circle indicates a single sample of the input signal, and a polygonal line which connects a sample and a sample indicates the window of a frame. Hereinafter, the input signal in discrete time n is expressed as Z(n).

Further, in a third stage, that is, a stage indicated by an arrow Q13, indicates the size of deviation time between the central positions of frames corresponding to the input signal and the reference signal. In particular, an arrow drawn in the third stage indicates the size of the deviation time $\Delta_r$ between the central positions of the frames.

A fourth stage, that is, a stage indicated by an arrow Q14, indicates the frame step $\phi_r$ of the reference signal. In particular, the start point and the end point of each arrow drawn in the fourth stage indicate the central position of the frame immediately before a process target frame and the central position of the process target frame, respectively.

In addition, a fifth stage, that is, a stage indicated by an arrow Q15, indicates the sample position (time) of the reference signal x(n). Meanwhile, in the fifth stage, a single circle expresses a single sample of the reference signal, and a polygonal line which connects samples indicates the window of a frame. Hereinafter, the reference signal of the discrete time n is expressed as x(n).

In the example, when the second stage is compared with the fifth stage, the sampling interval of the reference signal of the fifth stage is slightly larger than the sampling interval of the input signal of the second stage. Here, the sampling interval $T_s$ of the input signal is 1 and the sampling interval $T_s$ of the reference signal is 1+ε.

For example, with regard to the input signal of the second stage, short-time Fourier transform is performed using the length of a window function, that is, a frame size M and a frame step R, similarly to the general short-time Fourier transform. In the example, the frame size M is set to 9 samples and the frame step R is set to 5 samples.

In contrast, with regard to the reference signal shown in the fifth stage, the frame size is similarly set to M but the frame step is appropriately controlled such that the central position of the frame of the reference signal is not deviated by ±0.5 samples or greater from the central position of the frame of the input signal.

When the deviation of the sampling frequencies of the input signal and the reference signal is small, for example, when the deviation of the sampling frequencies is equal to or less than approximately 1000 ppm, the frame steps of most frames of the reference signal are frame step $\phi_r$=R, similarly to the input signal. However, when the frame step $\phi_r$ of the reference signal is appropriately set such that $\phi_r$=R+1 or $\phi_r$=R−1, it is possible to correct the deviation of the central positions of the frames in accordance with the deviation of the sampling frequencies of the input signal and the reference signal.

Hereinafter, the correction of the deviation of the central positions of the frames of the input signal and the reference signal by changing the frame step $\phi_r$ of the reference signal is referred to as frame step control.

In the example of FIG. 7, the size of the central frame position deviation time $\Delta_r$ is shown in the third stage. Since the central frame position deviation time $\Delta_r$ is not large in three frames, that is, frames r=0, 1, and 2, the frame step $\phi_r$ of the reference signal is processed while $\phi_r$ is set to R, similarly to the input signal.

In contrast, the frame step $\phi_2$ is set to R−1 in a frame r=3, and thus control is performed such that the central frame position deviation time $\Delta_r$ does not increase to ±0.5 samples or greater. Similarly, in a frame r=8, control is performed such that frame step $\phi_7$=R−1. Meanwhile, here, an example in which control is performed such that the central frame position deviation time $\Delta_r$ is less than ±0.5 samples has been described. However, control may be performed such that the central frame position deviation time $\Delta_r$ less than a predetermined number of samples which is sufficiently smaller than the length of the window, that is, the frame size M.

Even if central frame position deviation time between the input signal and the reference signal is kept within ±0.5 samples based on the above-described frame step control, it is difficult to acquire sufficient performance with the deviation all the time in the acoustic echo canceller.

Here, further, the amount corresponding to the central frame position deviation time $\Delta_r$ is approximately compensated by rotating the phase of the narrowed-band reference signal through the short-time Fourier transform. Hereinafter, the compensation for the deviation of the central positions of frames, acquired through the rotation of phase, is referred to as phase control.

In the present disclosure, the position between two signals having the different number of samples is adjusted by performing two types of control, that is, the frame step control and the phase control as shown in the second stage and the fifth stage in the drawing, thereby realizing an acoustic echo canceller for the frequency area which operates even when AD conversion is not synchronized with DA conversion.

Example of Configuration of Acoustic Echo Canceller

Subsequently, a detailed embodiment to which the present disclosure is applied will be described.

Figure 8:
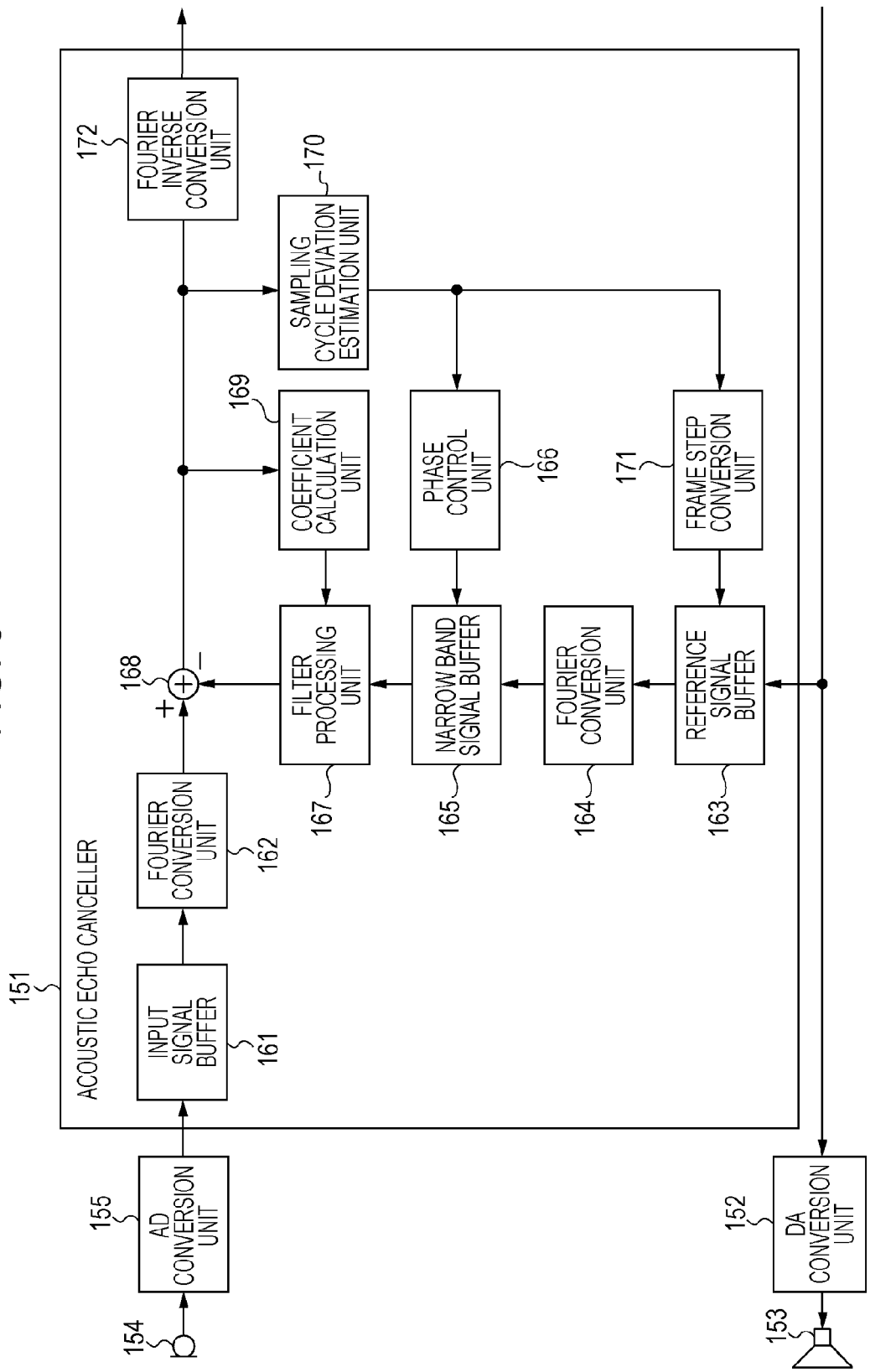
FIG. 8 is a diagram illustrating an example of the configuration of an acoustic echo canceller according to the embodiment of the present disclosure.

FIG. 8 is a diagram illustrating an example of the configuration of an acoustic echo canceller according to the embodiment of the present disclosure.

A reference signal which is a signal of sound to be reproduced is supplied to an acoustic echo canceller 151 shown in FIG. 8. In addition, after the reference signal is converted into a digital signal by a DA conversion unit 152, the digital signal is supplied to a speaker 153. The speaker 153 reproduces sound based on the reference signal supplied from the DA conversion unit 152. The sound output from the speaker 153 as above reaches a microphone 154 as acoustic echo.

The microphone 154 absorbs peripheral sound including sound output from the speaker 153, and supplies an input signal acquired through the absorption to an AD conversion unit 155. The AD conversion unit 155 converts the input signal which is the analog signal supplied from the microphone 154 into a digital signal, and supplies the digital signal to the acoustic echo canceller 151.

The acoustic echo canceller 151 removes acoustic echo components from the input signal based on the supplied reference signal and the input signal supplied from the AD conversion unit 155 and outputs an output time signal acquired through the removal.

The acoustic echo canceller 151 includes an input signal buffer 161, a Fourier transform unit 162, a reference signal buffer 163, a Fourier transform unit 164, a narrow band signal buffer 165, a phase control unit 166, a filter processing unit 167, a subtraction unit 168, a coefficient calculation unit 169, a sampling interval offset estimation unit 170, a frame step control unit 171, and an inverse Fourier transform unit 172.

The input signal buffer 161 temporarily holds the input signal supplied from the AD conversion unit 155, and supplies the input signal to the Fourier transform unit 162. The Fourier transform unit 162 performs time frequency conversion on the input signal supplied from the input signal buffer 161, and supplies a narrow band input signal, which is a frequency component acquired as a result of the conversion, to the subtraction unit 168.

The reference signal buffer 163 temporarily holds the supplied reference signal and supplies the reference signal to the Fourier transform unit 164. The Fourier transform unit 164 performs time frequency conversion on the reference signal supplied from the reference signal buffer 163, and supplies a narrow band reference signal, which is a frequency component acquired as a result of the conversion, to the narrow band signal buffer 165.

The narrow band signal buffer 165 temporarily holds the narrow band reference signal supplied from the Fourier transform unit 164. The phase control unit 166 controls the phase of the narrow band reference signal stored in the narrow band signal buffer 165 based on the estimated value of a sampling interval offset supplied from the sampling interval offset estimation unit 170.

Here, the sampling interval offset is the amount of deviation (offset) between the sampling interval of the input signal and the sampling interval of the reference signal, that is, the amount of deviation between the sampling interval of AD conversion in the AD conversion unit 155 and the sampling interval of DA conversion in the DA conversion unit 152. The estimated value of the sampling interval offset is acquired for each frame corresponding to both the input signal and the reference signal. Hereinafter, the estimated value of the sampling interval offset of a frame r is described as sampling interval offset $\epsilon_r'$.

The filter processing unit 167 performs an Acoustic Echo Canceller (AEC) filtering process using a filtering coefficient supplied from the coefficient calculation unit 169 on the narrow band reference signal, which is stored in the narrow band signal buffer 165 and the phase of which is controlled, and supplies an acquired filter output signal to the subtraction unit 168.

Here, a filter, which includes the filtering coefficient used for the filtering process performed by the filter processing unit 167, is a filter which simulates propagation characteristics from the speaker 153 to the microphone 154, and the waveform of the narrow band reference signal is deformed by the filtering process.

The subtraction unit 168 subtracts the filter output signal supplied from the filter processing unit 167 from the narrow band input signal supplied from the Fourier transform unit 162, and supplies an output signal acquired through the subtraction to the coefficient calculation unit 169, the sampling interval offset estimation unit 170, and the inverse Fourier transform unit 172.

When the filter output signal is subtracted from the narrow band input signal by the subtraction unit 168, the acoustic echo component which is caused by the reference signal and is included in the input signal is suppressed.

The coefficient calculation unit 169 updates the filtering coefficient based on the output signal supplied from the subtraction unit 168, and supplies the updated filtering coefficient to the filter processing unit 167. The sampling interval offset estimation unit 170 estimates the sampling interval offset based on the output signal supplied from the subtraction unit 168, and supplies the estimated sampling interval offset to the phase control unit 166 and the frame step control unit 171.

The frame step control unit 171 controls the frame step of the reference signal stored in the reference signal buffer 163 based on the sampling interval offset supplied from the sampling interval offset estimation unit 170. The inverse Fourier transform unit 172 performs frequency time conversion on the output signal supplied from the subtraction unit 168, performs overlap addition on the time signal of each frame acquired through the frequency time conversion, and outputs a resulting signal as an output time signal.

Meanwhile, more specifically, although the units of the acoustic echo canceller 151 are connected to each other so as to be able to transmit and receive information, some of the connection relationship therebetween are omitted in FIG. 8 in order to facilitate viewing of the drawing.

Acoustic Echo Cancelling Process

Subsequently, the operation of the acoustic echo canceller 151 will be described.

Figure 9:
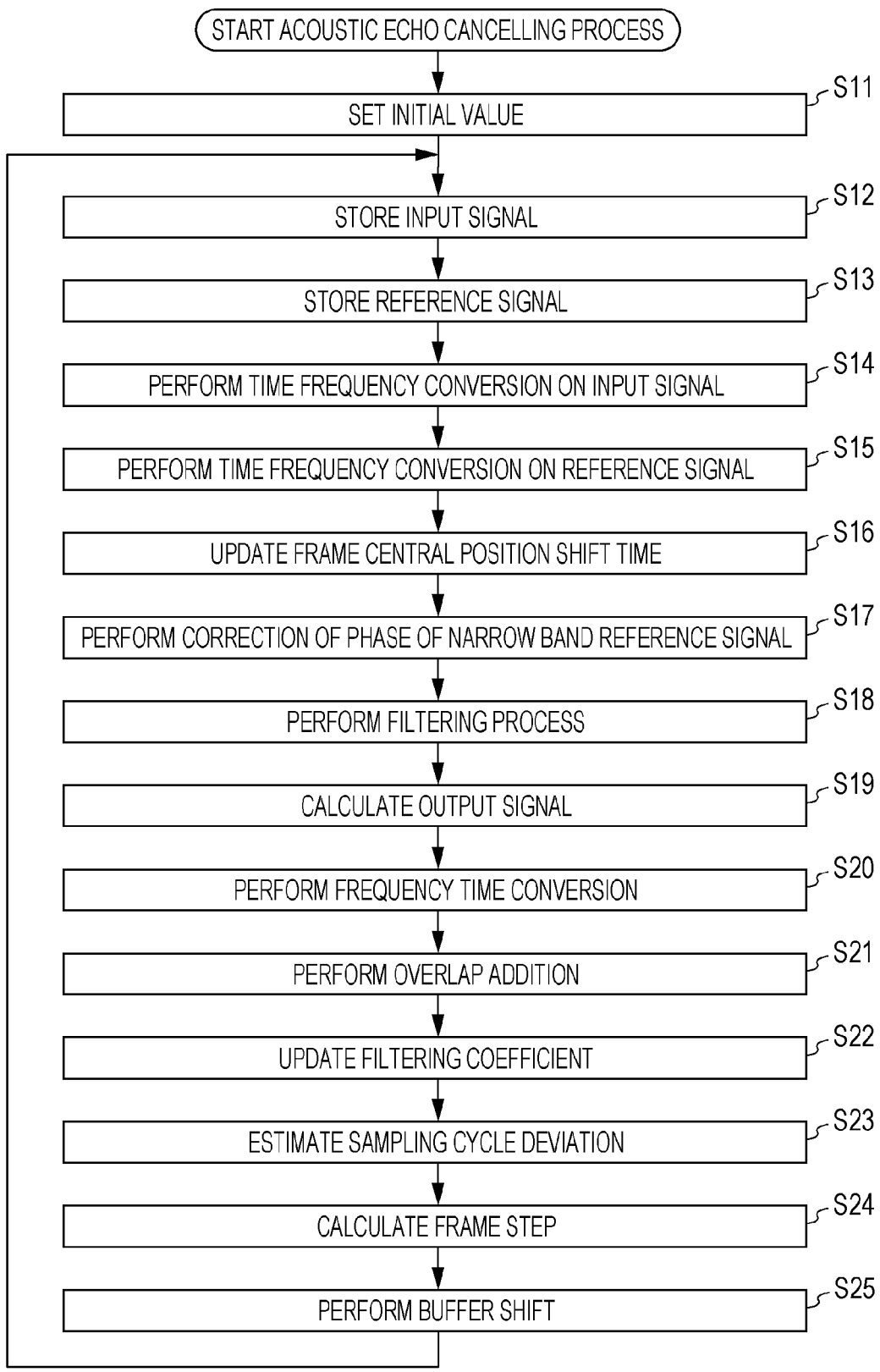
FIG. 9 is a flowchart illustrating acoustic echo cancelling process.

Hereinafter, an acoustic echo cancelling process performed by the acoustic echo canceller 151 will be described with reference to a flowchart in FIG. 9.

In step S11, the sampling interval offset estimation unit 170 sets the initial value of the sampling interval offset $\epsilon_r'$. For example, the initial value of the sampling interval offset $\epsilon_r'$ is set such that $\epsilon_{-1}'=0$.

In addition, as the initial value of a system, the value of a filtering coefficient $w_{kl}$ (where, k=0, ..., N/2, l=0, ..., L-1) is set to an appropriate random number, 0, or the like in the coefficient calculation unit 169. Here, an index k in the filtering coefficient $w_{kl}$ indicates a discrete frequency, and an index l indicates a frame.

In step S12, the input signal buffer 161 stores the input signal supplied from the AD conversion unit 155.

In addition, in step S13, the reference signal buffer 163 stores the supplied reference signal.

For example, an input signal acquired by the microphone 154 is converted into a digital signal through the AD conversion unit 155, and is set to the end of a line in the input signal buffer 161. The input signal buffer 161 stores sample data which is equal to or greater than at least the window size M of the short-time Fourier transform. Meanwhile, here, it is assumed that the sampling interval of the input signal in the AD conversion performed by the AD conversion unit 155 is 1 for brief explanation.

In contrast, the reference signal which is the digital signal is reproduced from the speaker 153 through the DA conversion unit 152. At this time, the sampling interval of the DA conversion performed by the DA conversion unit 152 may be different from the sampling interval of the AD conversion performed by the AD conversion unit 155. When the offset is set to $\epsilon$, the sampling interval of the DA conversion is expressed as 1+$\epsilon$.

Since the offset $\epsilon$ is caused by, for example, element errors, the change in temperature, or the like, the offset $\epsilon$ is generally unknown and smoothly changed in accordance with time.

In addition, the reference signal is also supplied to the acoustic echo canceller 151 and is set to the end of a line in the reference signal buffer 163. The reference signal buffer 163 stores sample data which is equal to or greater than at least the window size M of the short-time Fourier transform.

Meanwhile, more specifically, the storage of the input signal to the input signal buffer 161 and the storage of the reference signal to the reference signal buffer 163 are sequentially performed independently whenever the input signal and the reference signal are supplied.

In step S14, the Fourier transform unit 162 performs time frequency conversion on the input signal Z(n) stored in the input signal buffer 161, and supplies the narrow band input signal acquired as a result of the frequency conversion to the subtraction unit 168.

For example, Fourier transform unit 162 calculates subsequent Equation 1, and performs short-time Fourier transform as time frequency conversion.

$$Z(k, r) = \sum_{n=-(M-1)/2}^{(M-1)/2} W(n)z(n + rR)e^{-j2\pi kn/N} \quad (1)$$

Meanwhile, in Equation 1, W(n) indicates the window function, and M indicates the window size. In addition, R indicates the frame step and is set to a fixed value. Further, r indicates the frame number of the input signal, N indicates a Fast Fourier Transform (FFT) size, and k indicates a discrete frequency.

If the short-time Fourier transform is performed on the input signal Z(n) in an r-th frame as above, a narrow band input signal Z(k,r) is acquired for each discrete frequency k. Each narrow band input signal Z(k,r) acquired as above is a signal having a bandwidth which is narrower than that of the original input signal.

Meanwhile, here, an example in which the time frequency conversion is performed to acquire the narrow band input signal has been described. However, the narrow band input signal may be acquired by performing a filtering process using, for example, a Band Pass Filter (BPF).

In step S15, the Fourier transform unit 164 performs time frequency conversion on the reference signal x(n) stored in the reference signal buffer 163, supplies the narrow band reference signal acquired as a result of the time frequency conversion to the narrow band signal buffer 165, and stores the narrow band reference signal therein.

For example, the Fourier transform unit 164 performs the short-time Fourier transform as the time frequency conversion.

That is, if, for example, frame steps $\phi_0$ to $\phi_{r-1}$ from the head frame to the r-th frame of the reference signal are used, the central frame time $\Phi_r$ in the r-th frame is acquired as expressed in subsequent Equation 2.

$$\phi_r = \begin{cases} 0 & (r = 0) \\ \sum_{\rho=0}^{r-1} \phi_\rho & (r > 0) \end{cases} \quad (2)$$

Meanwhile, the frame step $\phi_r$ of the reference signal may be different from the frame step R of the input signal and may be a different value for each frame r.

The Fourier transform unit 164 calculates subsequent Equation 3 using the central frame time $\Phi_r$ in the r-th frame and performs short-time Fourier transform on the reference signal.

$$X(k, r) = \sum_{n=-(M-1)/2}^{(M-1)/2} W(n)x(n + \phi_r)e^{-j2\pi kn/N} \quad (3)$$

A narrow band reference signal X(k,r) is acquired for each discrete frequency k by performing the short-time Fourier transform on the reference signal x(n) in the r-th frame. Each narrow band reference signal X(k,r) acquired as above is a signal having a bandwidth which is narrower than that of the original reference signal.

As described above, the frame step $\phi_r$ determined by the frame step control unit 171 is used in the short-time Fourier transform performed on the reference signal. However, the determination of the frame step $\phi_r$ can be the determination of the central position of the window W(n) used in the short-time Fourier transform.

Meanwhile, the Fourier transform unit 164 acquires a frame step $\phi_{r-1}$ in the r-th frame from the frame step control unit 171, and calculates Equation 3. The frame step $\phi_{r-1}$ is determined by the frame step control unit 171. A detailed calculation method thereof will be described later.

In addition, the narrowed-band reference signal based on the short-time Fourier transform, that is, the narrow band reference signal X(k,r), is used for the filtering operation performed by the filter processing unit 167 at the latter stage. Therefore, the narrowed-band reference signal having at least L frames which correspond to a predetermined filter length is stored in the narrow band signal buffer 165.

In step S16, the phase control unit 166 updates the deviation time $\Delta_r$ (amount of deviation) between the central positions of the frames of the input signal and the reference signal based on the sampling interval offset supplied from the sampling interval offset estimation unit 170.

More specifically, the phase control unit 166 calculates subsequent Equation 4 using the frame step $\phi_\rho$ (where $\rho=0, \ldots, r-1$) and the sampling interval offset $\epsilon_\rho'$ (where, $\rho=0, \ldots, r-1$) acquired through a process performed up to an r−1-th frame, thereby calculating the deviation time $\Delta_r$ between the central positions of the frames in the r-th frame.

$$\Delta_r = \begin{cases} 0 & (r=0) \\ \sum_{\rho=0}^{r-1} \phi_\rho(1+\varepsilon'_\rho) - rR & (r>0) \end{cases} \quad (4)$$

Meanwhile, when the phase control unit 166 calculates Equation 4, the phase control unit 166 uses the frame step $\phi_\rho$ of each frame acquired from the frame step control unit 171.

In step S17, the phase control unit 166 corrects the phase of the narrow band reference signal stored in the narrow band signal buffer 165 based on the deviation time $\Delta_r$ between central positions of the frames.

For example, the phase control unit 166 performs a calculation for correcting the deviation between the central frame positions (times) of the input signal and the reference signal shown in the third stage of FIG. 7 through phase rotation.

More specifically, the phase control unit 166 corrects the narrow band reference signal X(k,r) through calculation of subsequent Equation 5, and acquires a narrow band reference signal X'(k,r) in which the central frame time is approximately matched with the central frame time of the narrow band input signal Z(k,r).

$$X'(k,r) = e^{-j2\pi k \Delta_r/N} X(k,r) \quad (k=0, \ldots, N/2) \quad (5)$$

That is, the phase control unit 166 reads the narrow band reference signal X(k,r) from the narrow band signal buffer 165, performs phase control through calculation of Equation 4 and Equation 5, and rewrites the narrow band reference signal X'(k,r) acquired as a result of the calculation into the narrow band signal buffer 165.

In step S18, the filter processing unit 167 performs a filtering process on the narrow band reference signal X'(k,r) stored in the narrow band signal buffer 165 using the filtering coefficient $w_{kl}$ supplied from the coefficient calculation unit 169. For example, the filter processing unit 167 performs the filtering process through calculation of subsequent Equation 6, and supplies a filter output signal Y(k,r) acquired as a result of the calculation to the subtraction unit 168.

$$Y(k,r) = \sum_{l=0}^{L-1} w_{kl} X'(k, r-l) \quad (k=0, \ldots, N/2) \quad (6)$$

In Equation 6, a Finite Impulse Response (FIR) filtering operation, in which a length L and the filtering coefficient $w_{kl}$ are used, is performed on the narrow band reference signal X'(k,r).

In step S19, the subtraction unit 168 subtracts the filter output signal Y(k,r) supplied from the filter processing unit 167 from the narrow band input signal Z(k,r) supplied from the Fourier transform unit 162 through calculation of subsequent Equation 7, thereby calculating an output signal E(k,r).

$$E(k,r) = Z(k,r) - Y(k,r) \quad (k=0, \ldots, N/2) \quad (7)$$

Meanwhile, the calculation of Equation 7 is only calculation for a positive frequency (k≥0), and an output signal E(-k,r) corresponding to a negative frequency is generated by replicating the positive frequency component through calculation of subsequent Equation 8. In addition, in Equation 8, "*" indicates a complex conjugate.

$$E(-k,r) = E^*(k,r) \quad (k=0, \ldots, N/2) \quad (8)$$

The subtraction unit 168 supplies the output signal E(k,r) acquired as above to the coefficient calculation unit 169, the sampling interval offset estimation unit 170, and the inverse Fourier transform unit 172.

In step S20, the inverse Fourier transform unit 172 performs frequency time conversion on the output signal E(k,r) supplied from the subtraction unit 168. That is, the inverse Fourier transform unit 172 performs inverse Fourier transform based on subsequent Equation 9, thereby generating a wide band signal e(n) which is an original time waveform based on the narrowed-bandwidth signal.

$$e(n) = \sum_{r=0}^{\infty} W_s(n-rR) \sum_{k=-N/2}^{N/2-1} E(k,r) e^{2\pi jk(n-rR)/N} \quad (9)$$

Meanwhile, in Equation 9, $W_s(n)$ indicates a window function for inverse conversion.

In step S21, the inverse Fourier transform unit 172 acquires an output time signal by performing overlap addition on the wide band signal e(n) of each frame acquired so far, and outputs the output time signal to the latter part.

In step S22, the coefficient calculation unit 169 updates the filtering coefficient based on the output signal E(k,r) supplied from the subtraction unit 168, and supplies the filtering coefficient to the filter processing unit 167.

More specifically, the coefficient calculation unit 169 sequentially calculates the filtering coefficient $w_{kl}$ by performing an operation of subsequent Equation 10 such that the square error between the output signal E(k,r) and the narrow band reference signal X'(k,r) is reduced as much as possible.

$$w_{kl}^{(new)} = w_{kl}^{(old)} + \mu E(k,r) X^*(k, r-l) \quad (k=0, \ldots, N/2, \; l=0, \ldots, L-1) \quad (10)$$

Meanwhile, in Equation 10, $\mu$ is a predetermined learning coefficient. Although the learning coefficient $\mu$ may be an integer, a structure may be introduced such that the learning coefficient $\mu$ is dynamically determined in accordance with the input signal and the reference signal as in the learning identification method, the normalization Least Mean Square (LMS) method, or the like.

In addition, in Equation 10, $w_{kl}^{(old)}$ and $w_{kl}^{(new)}$ respectively indicate a filtering coefficient $w_{kl}$ acquired before the update and a filtering coefficient $w_{kl}$ acquired after the update. Further, when Equation 10 is calculated, the coefficient calculation unit 169 reads a necessary narrow band reference signal X'(k,r) from the narrow band signal buffer 165 and uses the narrow band reference signal X'(k,r) for calculation.

In step S23, the sampling interval offset estimation unit 170 estimates a sampling interval offset $\varepsilon_r'$ through calculation of subsequent Equation 11 based on the output signal E(k,r) supplied from the subtraction unit 168, and supplies the sampling interval offset $\varepsilon_r'$ to the phase control unit 166 and the frame step control unit 171.

$$\varepsilon_r' = \varepsilon_{r-1}' - \mu' \sum_{k=1}^{N/2} k \operatorname{Im}\left( E(k,r) \sum_{l=0}^{L-1} w_{kl}^* X'^*(k, r-l) \sum_{\rho=0}^{L-l} \phi_{r-L+\rho} \right) \quad (11)$$

In the calculation of Equation 11, the sampling interval offset $\varepsilon_r'$ in the r-th frame is sequentially estimated such that the square error between the input signal and the filtered reference signal (filter output signal) is reduced as much as possible.

Meanwhile, in Equation 11, $\mu'$ is a predetermined learning coefficient. Similarly to the above-described learning coefficient $\mu$, a structure may be introduced such that the learning coefficient $\mu'$ is dynamically determined in accordance with the input signal and the reference signal. In addition, Im is a symbol indicative of the imaginary part of a complex number in Equation 11.

When such Equation 11 is calculated, the sampling interval offset estimation unit 170 acquires the narrow band reference signal X'(k,r), the filtering coefficient $w_{k,r}$, and the frame step $\phi_r$ of each frame from the narrow band signal buffer 165, the coefficient calculation unit 169, and the frame step control unit 171, and performs calculation.

In step S24, the frame step control unit 171 calculates the frame step $\phi_r$ of the subsequent frame of the reference signal x(n) by calculating subsequent Equation 12 based on the sampling interval offset $\epsilon_r'$ supplied from the sampling interval offset estimation unit 170. That is, the frame step $\phi_r$ for determining the subsequent process frame position of the reference signal is calculated through Equation of 12 based on the deviation time $\Delta_r$ between the central positions of the frames in the r-th frame and the sampling interval offset $\epsilon_r'$ in the r-th frame.

$$\phi_r = R - \text{round}(\Delta_r + \epsilon_r' R) \quad (12)$$

Meanwhile, in Equation 12, round( ) is a rounding-off function. In addition, the frame step control unit 171 acquires the deviation time $\Delta_r$ between the central positions of the frames from the phase control unit 166 and performs calculation.

In step S25, the input signal buffer 161 and the reference signal buffer 163 shift the buffers.

That is, the input signal buffer 161 moves the stored input signal in the buffer head direction by the number of samples corresponding to the predetermined frame step R. In addition, the reference signal buffer 163 moves the stored reference signal in the buffer head direction by the number of samples corresponding to the frame step $\phi_r$ supplied from the frame step control unit 171.

If the buffers are shifted as described above, the process returns to step S12, and the above-described process is repeated until the end of the acoustic echo cancelling process is instructed. That is, asynchronous acoustic echo cancellation calculation of a subsequent frame is performed.

As above, the acoustic echo canceller 151 performs the frame step control and the phase control on the reference signal, thereby performing the acoustic echo cancellation while correcting the deviation between the central positions of the frames of the input signal and the reference signal. Therefore, it is possible to appropriately adjust the sampling points of the input signal and the reference signal, that is, the corresponding relationship between the samples of the input signal and the reference signal in each frame, and thus it is possible to suppress acoustic echo with higher arithmetic efficiency and high precision.

Therefore, according to the acoustic echo canceller 151, even in a system in which AD conversion performed on the input signal is not synchronized with the DA conversion performed on the reference signal, it is possible to synchronously suppress wrapped-around components (echo) with high precision if offset is estimated. As a result, for example, even in the related-art equipment, such as microphone equipment connected through an USB, in which it is difficult to perform echo cancellation, it is possible to perform echo suppression with high arithmetic efficiency and performance.

Figure 10:
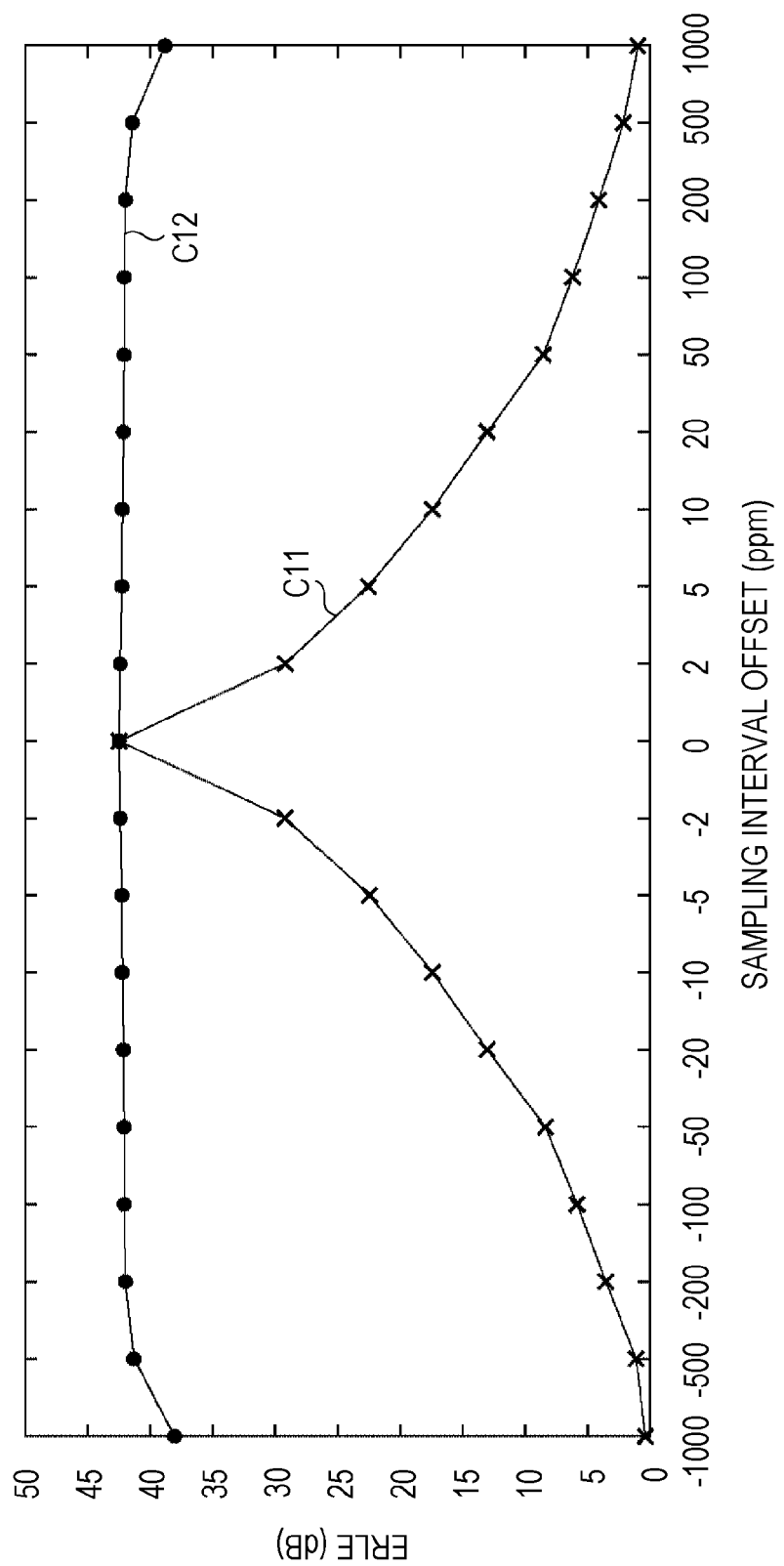
FIG. 10 is a graph illustrating an echo suppression performance according to the embodiment of the present disclosure.

Here, FIG. 10 illustrates the result of comparison of acoustic echo suppression performance acquired by a general method and a method according to the embodiment of the present disclosure. Meanwhile, in FIG. 10, a horizontal axis indicates the deviation between sampling intervals, more specifically, the amount of deviation between DA conversion on a speaker side based on AD conversion on a microphone side. In addition, a vertical axis indicates echo suppression performance.

In an example of FIG. 10, a polygonal line C11 indicates echo suppression performance based on the general method, and a polygonal line C12 indicates echo suppression performance (ERLE) based on the method according to the embodiment of the present disclosure. Meanwhile, the echo suppression performance indicated by the polygonal line C11 is the same as the echo suppression performance shown in FIG. 3.

When the polygonal line C11 is compared with the polygonal line C12, the suppression performance is dramatically reduced due to the deviation between the AD conversion and the DA conversion in the polygonal line C11. In contrast, in the polygonal line C12, it is understood that high suppression performance approximately 40 dB is secured even in a width range, that is, deviation approximately ±1000 ppm.

Second Embodiment

Another Application Example of Present Disclosure

Meanwhile, in the above, a case in which the present disclosure is applied to the acoustic echo canceller has been described. However, it is possible to apply the present disclosure to general equipment which performs sampling point adjustment such that the sampling point of another signal corresponds to the sampling point of any signal.

Figure 11:
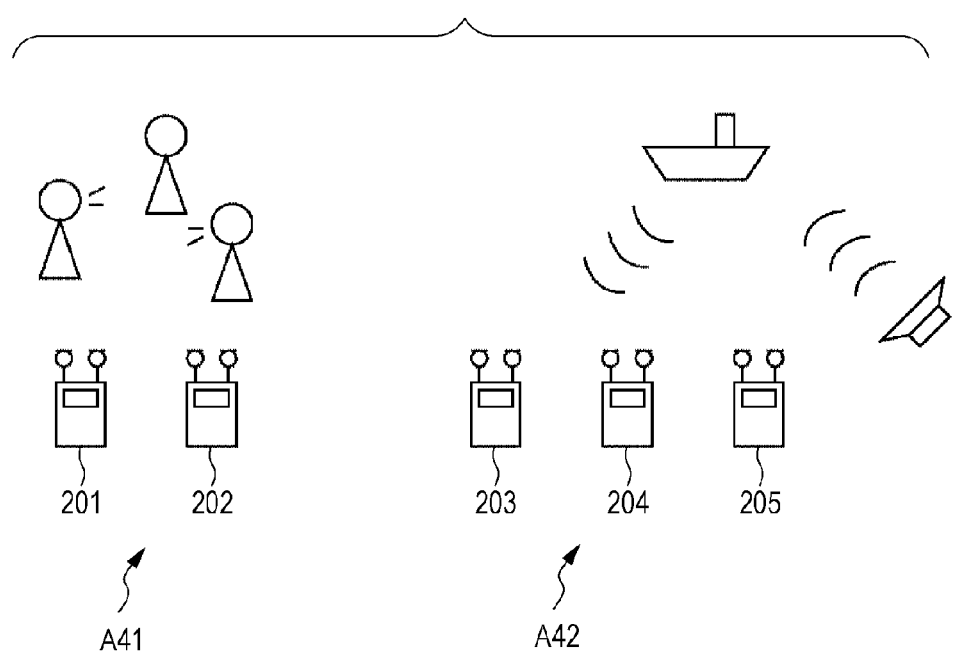
FIG. 11 is a diagram illustrating an application example of the present disclosure.

Here, FIG. 11 illustrates another application example of the present disclosure.

For example, it is possible to apply the present disclosure to a case in which the same convergence is recorded by a plurality of pieces of equipment 201 and 202 or a case in which the same event is recorded by a plurality video cameras, as shown by an arrow A41 of FIG. 11.

In this case, the sampling intervals of AD conversion performed by the plurality of equipment 201 and 202 are not completely identical. For example, even when the sampling intervals of the equipment 201 and 202 are adjusted to formally the same 48 kHz or the like, the sampling interval of each piece of equipment generally has an offset approximately several hundreds of ppm, and thus it is difficult to synchronize a plurality of recording data with high precision in a case of, for example, editing processing or the like.

In addition, even if the synchronization of recording data is adjusted with high precision at certain time, the sampling points of the recording data are largely deviated after several to several tens of minutes.

In this case, if the present disclosure is applied, it is possible to estimate a sampling interval offset every moment, and thus it is possible to approximately completely synchronize the plurality of recording data every moment.

In addition, as shown by an arrow A42, it is possible to apply the present disclosure to a case in which a (ultrasonic) sound wave emitted from equipment or a vehicle in a remote place or the reflected sound of a (ultrasonic) sound wave emitted from another piece of equipment is detected, similarly to a radar based on sound or a ultrasonic wave. In this example, sound is absorbed by three pieces of sound receiving equipment 203 to 205.

For example, when a single piece of sound receiving equipment is provided or a plurality of pieces of sound receiving equipment are provided at a short distance, it is not difficult to form a complete synchronization system using the same original oscillator. However, when the plurality of sound receiving equipment are provided and, in particular, the distance between the sound receiving equipment is far, there is a case in which sound receiving signals acquired by the respective pieces of sound receiving equipment form an asynchronous system.

When the position of a source (or reflector) is identified based on a principle of triangulation or the like, highly precise synchronization is necessary between the sound receiving signals. However, if the present disclosure is applied, it is possible to estimate a sampling interval offset every moment with high precision, and thus it is possible to approximately completely synchronize the sound receiving signals.

Figure 12:
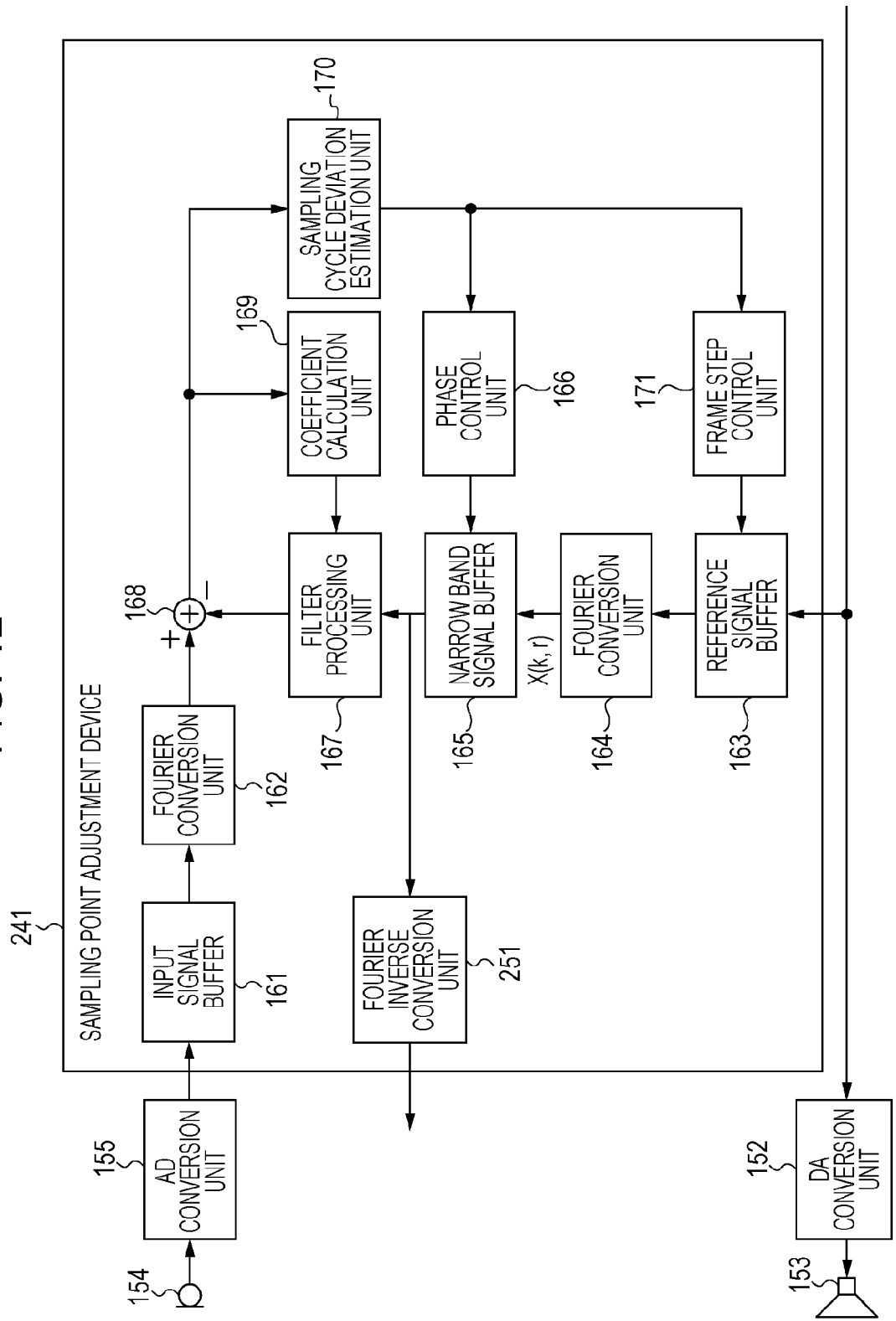
FIG. 12 is a diagram illustrating an example of the configuration of a sampling point adjustment apparatus according to the embodiment of the present disclosure.

When two signals are synchronized and used for an arbitrary process, a sampling point adjustment apparatus to which the present disclosure is applied is formed as shown in, for example, in FIG. 12. Meanwhile, in FIG. 12, the same reference numerals are attached to parts corresponding to the case of FIG. 8, and the description thereof will not be repeated.

A sampling point adjustment apparatus 241 shown in FIG. 12 includes an input signal buffer 161, a Fourier transform unit 162, a reference signal buffer 163, a Fourier transform unit 164, a narrow band signal buffer 165, a phase control unit 166, a filter processing unit 167, a subtraction unit 168, a coefficient calculation unit 169, a sampling interval offset estimation unit 170, a frame step control unit 171, and an inverse Fourier transform unit 251.

The sampling point adjustment apparatus 241 shown in FIG. 12 is different from the acoustic echo canceller 151 of FIG. 8 in that the inverse Fourier transform unit 251 is provided instead of the inverse Fourier transform unit 172 but form the same configuration in other respects.

In the sampling point adjustment apparatus 241, the inverse Fourier transform unit 251 performs inverse Fourier transform on a narrow band reference signal X'(k,r) stored in the narrow band signal buffer 165, and outputs an output time signal acquired by performing overlap addition on the wide band signal e(n) of each frame acquired as a result of the inverse Fourier transform.

The output time signal acquired as above is a reference signal acquired through conversion performed in a state in which the output time signal is synchronized with the input signal acquired by the microphone 154.

As above, according to the sampling point adjustment apparatus 241, it is possible to precisely synchronize microphone recording signals acquired by a plurality of equipment, and thus it is easy to perform, for example, the editing process for the recording of a conference or an event performed by the plurality of equipment or it is easy to use radar equipment using a ultrasonic wave.

However, the above-described series of processes can be performed by hardware or software. When the series of processes is performed by software, a program which forms the software is installed in a computer. Here, the computer includes a computer embedded with dedicated hardware, or, for example, a general-purpose computer which can perform various functions by installing various programs.

Figure 13:
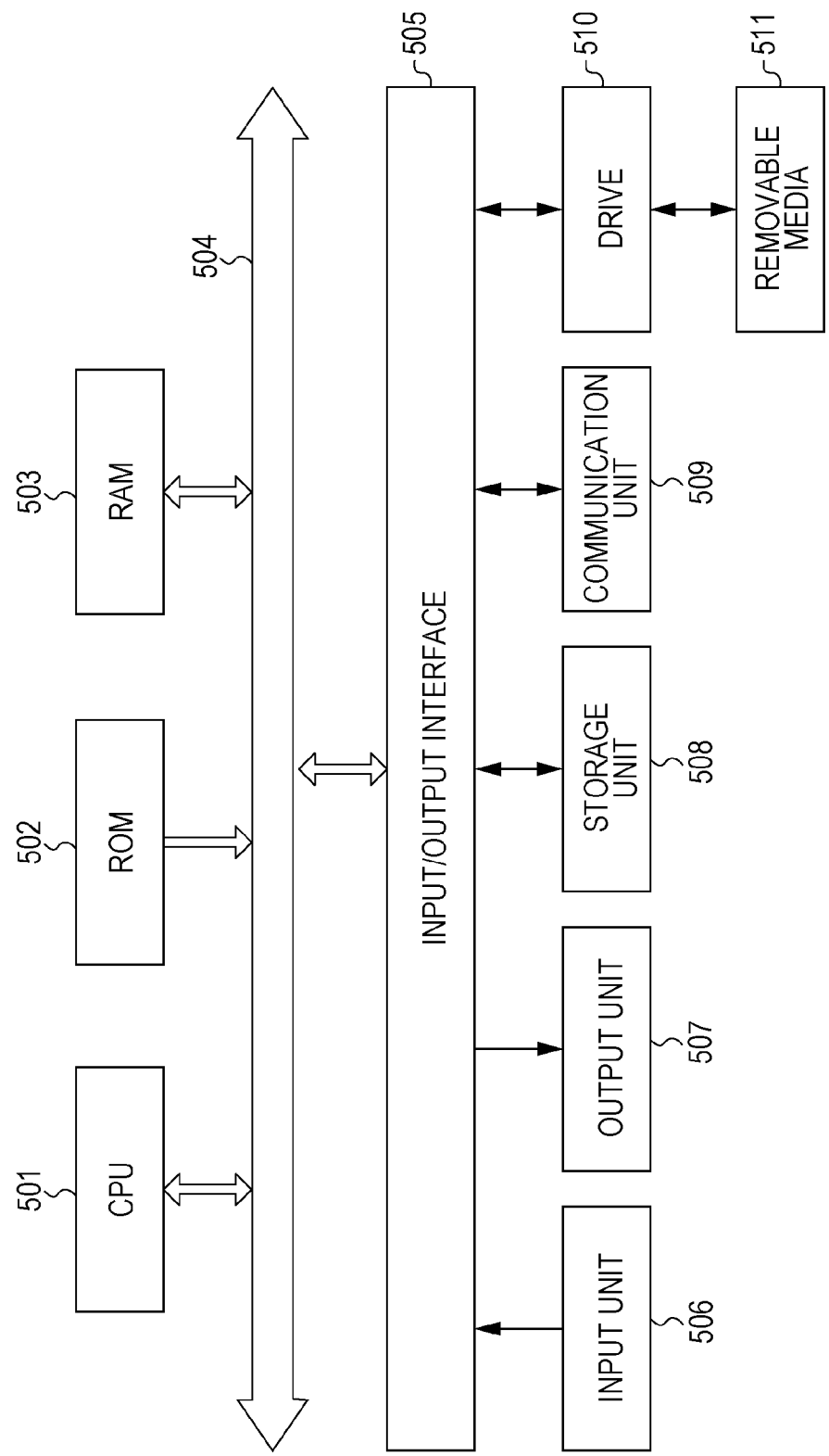
FIG. 13 is a diagram illustrating an example of the configuration of a computer.

FIG. 13 is a block diagram illustrating an example of the configuration of the hardware of a computer which executes above-described series of processes by a program.

In a computer, a Central Processing Unit (CPU) 501, a Read Only Memory (ROM) 502, and a Random Access Memory (RAM) 503 are connected to each other through a bus 504.

Further, an input and output interface 505 is connected to the bus 504. An input unit 506, an output unit 507, a recording unit 508, a communication unit 509, and a drive 510 are connected to the input and output interface 505.

The input unit 506 includes a keyboard, a mouse, a microphone, an imaging element, or the like. The output unit 507 includes a display, a speaker, or the like. The recording unit 508 includes a hard disk, a nonvolatile memory, or the like. The communication unit 509 includes a network interface or the like. The drive 510 drives a removable media 511, such as a magnetic disk, an optical disc, a magneto optical disk, a semiconductor memory, or the like.

In the computer which is configured as described above, the above-described series of processes are performed in such a way that the CPU 501 loads, for example, a program recorded in the recording unit 508 to the RAM 503 through the input and output interface 505 and the bus 504, and executes the program.

The program executed by the computer (CPU 501) can be recorded in, for example, the removable media 511 as a package media or the like, and can be provided. In addition, the program can be provided through a wired or wireless transmission medium such as a local area network, the Internet, or digital satellite broadcasting.

In the computer, the program can be installed in the recording unit 508 through the input and output interface 505 by mounting the removable media 511 on the drive 510. In addition, the program can be received by the communication unit 509 through the wired or wireless transmission medium, and can be installed in the recording unit 508. In addition, the program can be installed in the ROM 502 or the recording unit 508 in advance.

Meanwhile, the program executed in the computer may be a program which causes a process to be performed in time series manner according to the order described in the specification or a program which causes a process to be performed in parallel or at a necessary time, that is, a time at which the program is called.

In addition, the embodiment of the present disclosure is not limited to the above-described embodiment, and various modifications are possible without departing from the gist of the present disclosure.

For example, the present disclosure can include a configuration of cloud computing in which a plurality of apparatuses share a single function through a network and cooperatively process the function.

In addition, each step described in the above-described flowchart can be not only performed by a single apparatus but also cooperatively performed by a plurality of apparatuses.

Further, when a plurality of processes are included in a single step, the plurality of processes included in the single step can be not only performed by a single apparatus but also cooperatively performed by a plurality of apparatuses.

In addition, the advantages described in the specification are only examples and are not limited. Further, other advantages may be acquired.

Further, the present disclosure can include configurations as follows:

(1) A sampling point adjustment apparatus includes: a frequency conversion unit that converts a first signal and a second signal into a first narrow band signal and a second narrow band signal through frequency conversion; a central position determination unit that determines a central position of a window of the frequency conversion for the second signal based on an estimated value of a sampling interval offset between the first narrow band signal and the second narrow band signal; and a phase control unit that controls a phase of the second narrow band signal based on the estimated value.

(2) The sampling point adjustment apparatus of (1) further includes a filter processing unit that performs a filtering process on the second narrow band signal, the phase of which is controlled by the phase control unit.

(3) The sampling point adjustment apparatus of (2) further includes a subtraction unit that suppresses an echo component of the second signal, which is included in the first signal, by subtracting the second narrow band signal on which the filtering process is performed from the first narrow band signal.

(4) In sampling point adjustment apparatus of (3), the second signal is a signal which is reproduced by a speaker, and the first signal is a signal which is acquired by absorbing peripheral sound including sound based on the second signal.

(5) The sampling point adjustment apparatus of any one of (2) to (4) further includes an estimation unit that estimates the estimated value of the sampling interval offset based on the first narrow band signal and the second narrow band signal on which the filtering process is performed.

(6) The sampling point adjustment apparatus of any one of (2) to (5) further includes a coefficient calculation unit that calculates a filtering coefficient to be used for the filtering process based on the first narrow band signal and the second narrow band signal on which the filtering process is performed.

(7) In sampling point adjustment apparatus of any one of (1) to (6), the frequency conversion unit performs short-time Fourier transform as the frequency conversion.

(8) A sampling point adjustment method includes: converting a first signal and a second signal into a first narrow band signal and a second narrow band signal through frequency conversion; determining a central position of a window of the frequency conversion for the second signal based on an estimated value of a sampling interval offset between the first narrow band signal and the second narrow band signal; and controlling a phase of the second narrow band signal based on the estimated value.

(9) A program which causes a computer to execute a process includes: converting a first signal and a second signal into a first narrow band signal and a second narrow band signal through frequency conversion; determining a central position of a window of the frequency conversion for the second signal based on an estimated value of a sampling interval offset between the first narrow band signal and the second narrow band signal; and controlling a phase of the second narrow band signal based on the estimated value.

It should be understood by those skilled in the art that various modifications, combinations, sub-combinations and alterations may occur depending on design requirements and other factors insofar as they are within the scope of the appended claims or the equivalents thereof.

What is claimed is:

1. A sampling point adjustment apparatus, comprising:
a frequency conversion unit configured to convert a first signal and a second signal into a first narrow band signal and a second narrow band signal, respectively through frequency conversion;
a central position determination unit configured to determine a central position of a window of the frequency conversion for the second signal based on an estimated value of a sampling interval offset between the first narrow band signal and the second narrow band signal; and
a phase control unit configured to control a phase of the second narrow band signal based on the estimated value,
wherein the second signal is a signal which is reproduced by a speaker, and
wherein the first signal is a signal which is acquired by absorption of peripheral sound that includes sound based on the second signal.

2. The sampling point adjustment apparatus according to claim 1, further comprising:
a filter processing unit configured to filter the second narrow band signal, the phase of which is controlled by the phase control unit.

3. The sampling point adjustment apparatus according to claim 2, further comprising:
a subtraction unit configured to suppress an echo component included in the first signal, by subtraction of the filtered second narrow band signal from the first narrow band signal.

4. The sampling point adjustment apparatus according to claim 2, further comprising:
an estimation unit configured to estimate the estimated value of the sampling interval offset based on the first narrow band signal and the filtered second narrow band signal.

5. The sampling point adjustment apparatus according to claim 3, further comprising:
a coefficient calculation unit configured to calculate a filtering coefficient to be used to filter the second narrow band signal based on the subtraction of the second narrow band signal from the first narrow band signal.

6. The sampling point adjustment apparatus according to claim 1,
wherein the frequency conversion unit is further configured to use short-time Fourier transform for the frequency conversion.

7. A sampling point adjustment method, comprising:
converting a first signal and a second signal into a first narrow band signal and a second narrow band signal, respectively through frequency conversion;
determining a central position of a window of the frequency conversion for the second signal based on an estimated value of a sampling interval offset between the first narrow band signal and the second narrow band signal; and
controlling a phase of the second narrow band signal based on the estimated value,
wherein the second signal is a signal which is reproduced by a speaker, and
wherein the first signal is a signal which is acquired by absorption of peripheral sound that includes sound based on the second signal.

8. A non-transitory computer-readable recording medium having stored thereon a set of computer-executable instructions for causing a computer to execute operations, comprising:

converting a first signal and a second signal into a first narrow band signal and a second narrow band signal, respectively through frequency conversion;

determining a central position of a window of the frequency conversion for the second signal based on an estimated value of a sampling interval offset between the first narrow band signal and the second narrow band signal; and controlling a phase of the second narrow band signal based on the estimated value, wherein the second signal is a signal which is reproduced by a speaker, and wherein the first signal is a signal which is acquired by absorption of peripheral sound that includes sound based on the second signal.

* * * * *